INVENTORS
MOMIR BABUNOVIC
VIRGIL M. STAPF
BY
*Gravely, Lieder & Woodruff*
ATTORNEYS United States Patent Office 3,322,283
Patented May 30, 1967

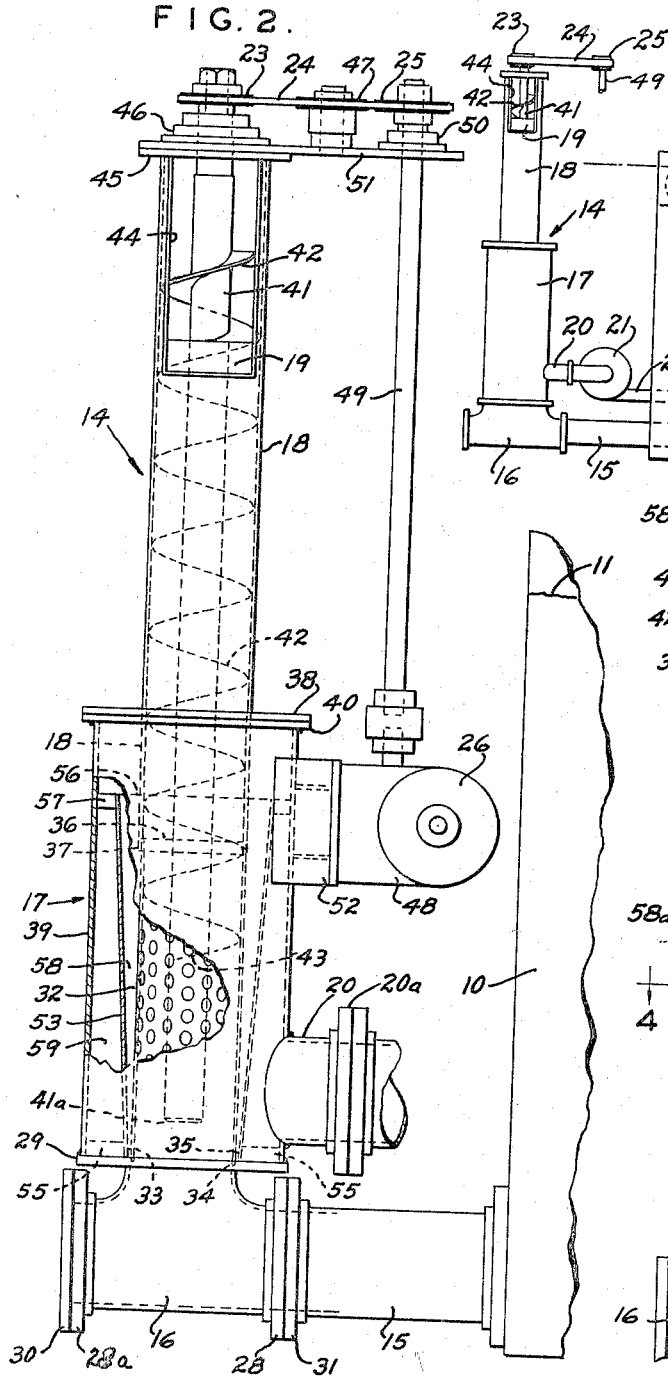
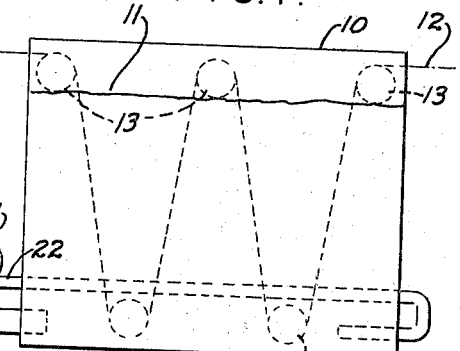
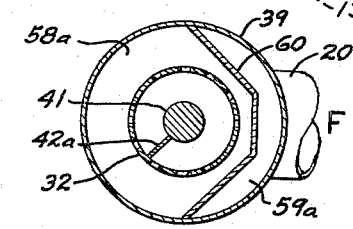
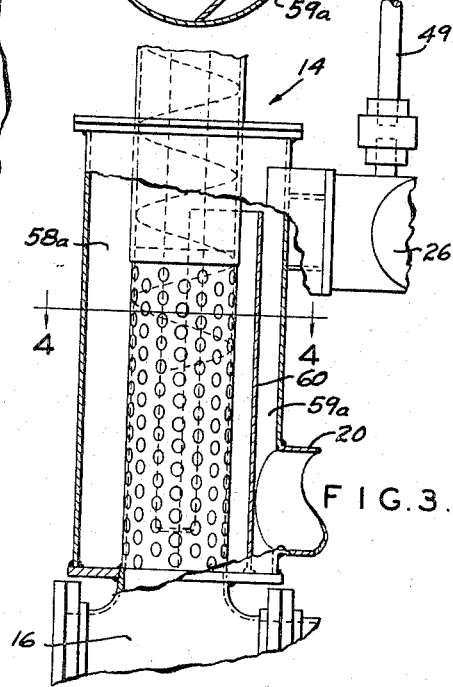

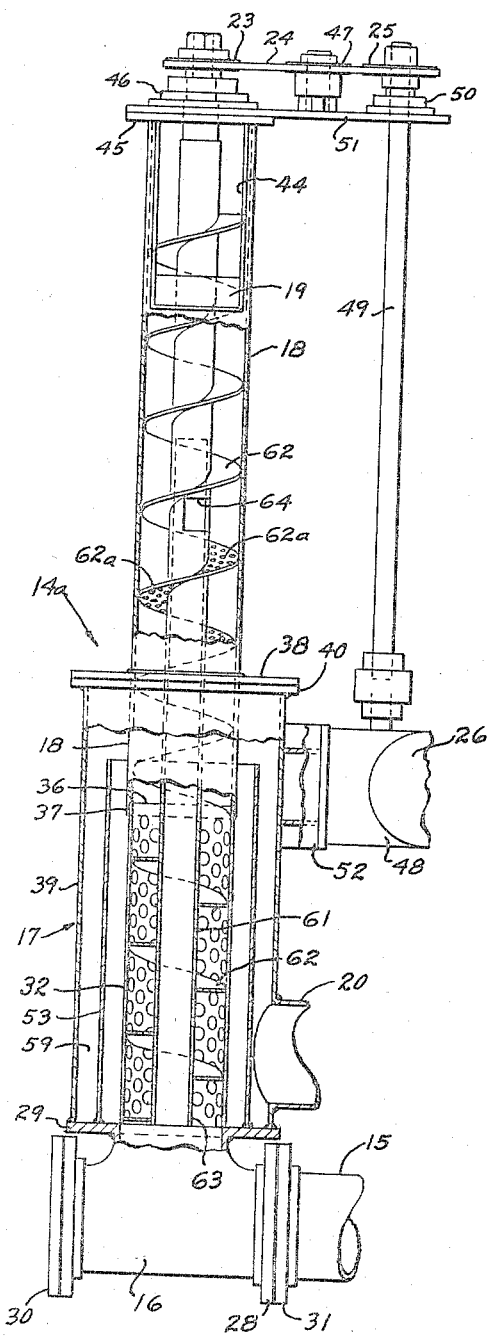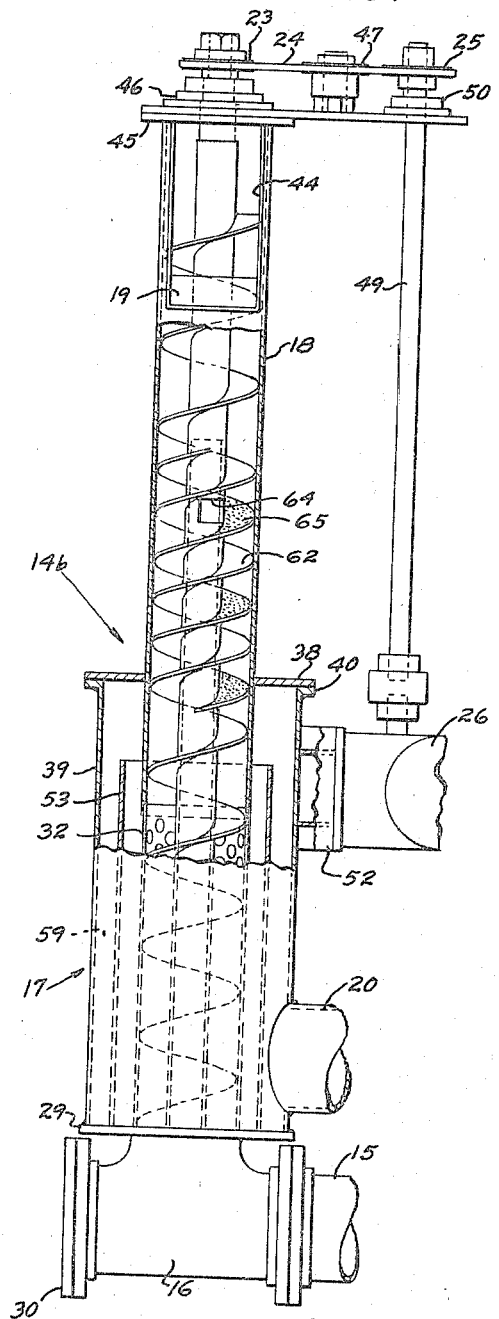

3,322,283
SEPARATOR APPARATUS FOR FLUID ENTRAINED SOLIDS
Momir Babunovic, Kirkwood, and Virgil Melvin Stapf, St. Louis, Mo., assignors to Barry-Wehmiller Company, a corporation of Missouri
Filed Mar. 26, 1964, Ser. No. 354,899
5 Claims. (Cl. 210—167)

This invention relates to improvements in separator apparatus handling fluids which carry solids and pulpy materials.

The improved apparatus to be described with particular reference to handling caustic washing fluids commonly used in bottle washing machines is also useful for handling a variety of fluids containing solids or semi-solids that must be separated out so that the fluid may be relieved of such foreign materials rapidly and as nearly completely as possible. Thus, the separator apparatus may have many uses in industrial systems where separation of solids, semi-solids, and the like have to be separated from fluids which are contaminated thereby so that the fluids may be cleaned prior to re-use or for other purposes.

In bottle washing machines the washing fluid is usually a caustic solution which is used to remove labels adhesively applied to the bottles or containers, as well as to dislodge foreign materials from the interior. The caustic solution is generally recirculated in the washing machine so that it may be reused many times for economy of operation. In order for the caustic washing solution to do a good job and clean the bottles or containers it must be substantially freed of solids, semi-solids and materials reduced to a pulpy condition before being recirculated to the washer machine. If the separation of the solids and other foreign materials is not satisfactorily accomplished, the recirculated fluid carries the same back into the washer where it can again contaminate the bottles or containers. This is an undesirable condition, so that an object of the invention is to provide separator apparatus which will effectively perform the separation function in an improved and efficient manner.

It is also an object of this invention to provide separator apparatus which can handle large volumes of fluid in a gentle manner so as not to cause pulping of insolubles and caustic foaming problems.

An object of this invention is also to provide separator apparatus having novel means to lessen the need for large static head pressure conditions or high pressure pumping equipment.

Another object of this invention is to provide separator apparatus which will handle bottle labels in a manner to reduce the pulping thereof and remove labels, label pulp and other materials under low static head conditions.

Another object of this invention is to provide separator apparatus which embodies a novel arrangement of conveyor and baffle means so that both high wet strength labels and labels which easily disintegrate to a pulpy mass can be handled indiscriminately and at high volume rates of fluid flow.

A preferred form of the present invention consists in an arrangement of fluid handling conduits having a perforated screen section to receive the fluid and entrained materials to be separated, a casing enclosing the screen section and to which the cleaned fluid outlet is connected, a baffle member within the casing to provide a fluid receiving space next to the screen section and another space for discharge, while maintaining the screen section submerged at all times so that the fluid gently flows out through the screen section at a substantially equal pressure from end to end, or top to bottom, and passes into the receiving space and then over the baffle to the discharge space and outlet, and conveyor means operating in the screen section to continuously move the solids and contaminating materials out of the fluid and to a point of discharge substantially free of the fluid.

The invention also consists in the parts, components and organization of parts and components hereinafter shown and described, and reference will be made to various forms of apparatus illustrated in the accompanying drawings, wherein:

FIG. 1 is a schematic view of a washing machine showing one form of the present separator apparatus connected thereto;

FIG. 2 is an enlarged partly sectional elevational view of the separator apparatus shown in FIG. 1;

FIG. 3 is a fragmentary and partly sectional view of a modified separator apparatus useful in the combination shown in FIG. 1;

FIG. 4 is a transverse sectional view as seen at line 4—4 in FIG. 3;

FIG. 5 is a view similar to FIG. 2 showing a further modified separator apparatus;

FIG. 6 is a view similar to FIG. 2 showing still another modified separator apparatus.

Figure 7:
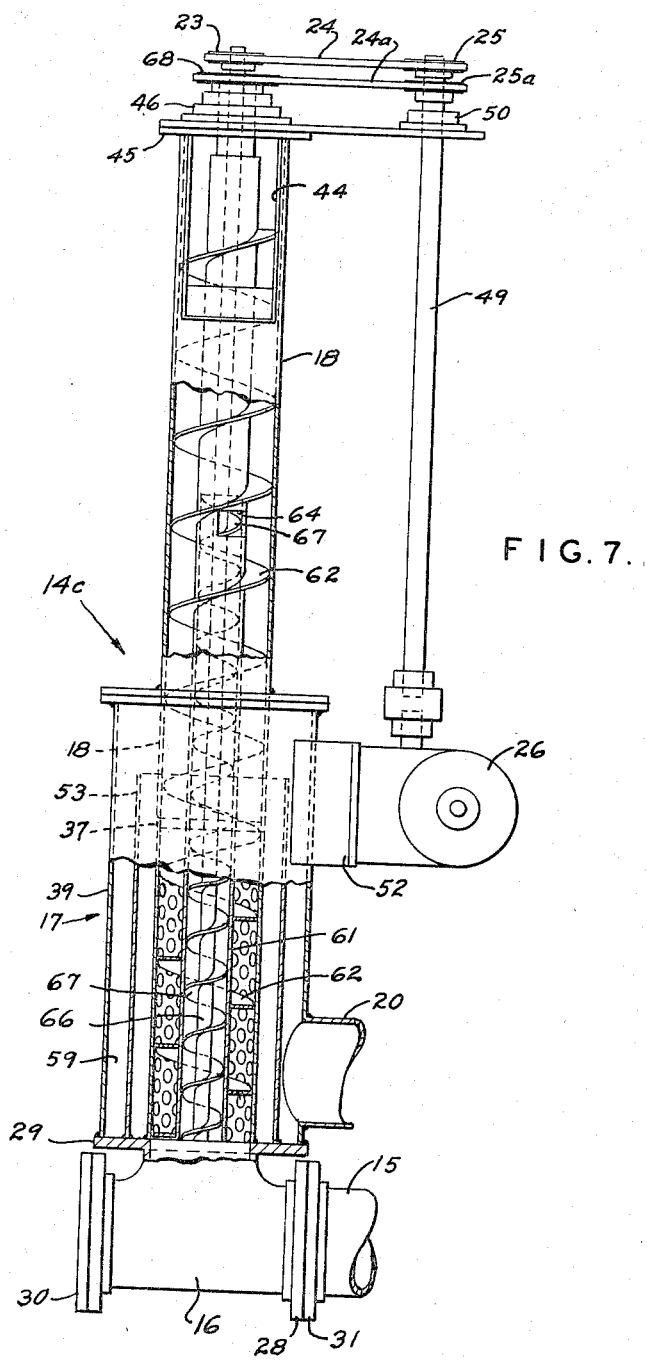
FIG. 7 is a view similar to FIG. 2 showing yet another modified separator apparatus.

Referring now to FIG. 1, it can be seen that the system includes a schematic view of a bottle washer tank 10 which contains a washing fluid up to the level 11 as indicated. A conveyor 12 of any suitable type is trained over a series of wheels 13 so that bottles, or other containers, to be washed are carried downwardly and upwardly several times in the washing solution before being discharged from the tank 10. The washing fluid is usually a caustic solution of a strength suitable for dissolving the adhesive materials used to secure labels, as well as for removing foreign materials and debris which may have collected internally of the bottles. Unless there is some apparatus for separating the labels and foreign materials of a non-soluble character from the caustic solution, such solution will very quickly become contaminated and lose its effectiveness. On the other hand, by rapidly and substantially completely removing labels and foreign material from the washing solution it is possible to reuse the washing fluid many times before it becomes excessively contaminated with soluble foreign materials, such as the label adhesive materials.

In FIG. 1 the washing tank 10 is shown provided with separator apparatus generally shown at 14. Such apparatus is connected by a fed pipe 15 leading from the bottom area of the washer tank into a T-section 16. A casing 17 is connected to the T-section 16, and from the casing 17 there extends upwardly a discharge conduit 18 having an outlet chute 19. The casing 17 is provided with a cleaned fluid outlet pipe 20 which is connected into the suction of a pump 21 of any suitable character, and the pump returns the washing fluid through the return pipe 22 to the washer tank 10.

As will be shown in other views, the separator apparatus 14 is provided with suitable conveyor means having a drive pulley 23 at its upper end, the pulley 23 being driven by a belt 24 connected to the power take off pulley 25 of a drive motor 26. It is understood that the view of FIG. 1 is schematic only.

The outlet 19 from the conduit 18 must be located at a position at least slightly above the level 11 for the washing fluid in the tank 10 so that there will be no possibility when the apparatus is shut down for the washing solution to be drained off through the separator apparatus. The material discharged at the chute 19 consists in the labels and foreign material which has been separated from the washing fluid. This material is substantially free of fluid, so that the loss of washing fluid is relatively small in comparison to the economies effected by removing the contaminating materials which would otherwise be carried back into the washing tank where it can be redeposited on the bottles or containers and be carried on out with the latter.

The separator apparatus 14 generally disclosed in FIG. 1 is shown in greater detail in FIG. 2, and attention will now be directed to this disclosure for a more complete understanding of its characteristics. The separator 14 comprises a T-section 16 (hereinafter referred to as the inlet) having flanges 28 and 28a defining inlet openings to the interior. The discharge from the inlet 16 is defined by the enlarged flange 29. The inlet 16 provides for a fluid supply connection at either flange 28 or 28a, and when one is not being utilized it is suitably closed against fluid leakage by a cover 30 which is interchangeably suitable for mounting at either flange 28 or 28a. In the present case the flange 28 is utilized as the supply to the inlet 16, and is suitably connected to the flange 31 on the pipe 15 which brings the washing fluid and entrained solids, pulpy materials and foreign matter from the washing tank 10. The flange 29 on the inlet 16 supports a screen or perforated sleeve 32, and the upper end 36 of the sleeve 32 is connected to the lower end 37 of the discharge conduit 18. As is shown the lower end 33 of the sleeve 32 is seated in a recess 34 in the flange 29, along with an encircling band 35 on the outside of the end 33 which provides a seal at the sleeve receiving recess 34. The perforated sleeve may be a cylindrical member having a plurality of perforations or apertures (as shown) extending from end to end, and of a size sufficient to permit fluid to pass through while restricting the passage of foreign materials. The upper end 36 of perforate sleeve 32 is received in a recess or step flange in the lower end 37 of the conduit 18, conduit 18 being an imperforate tubular member carrying a supporting flange 38 spaced from the lower end 37 so that the conduit 18 will have a means of support on a tubular casing 39 which is connected to the flange 29 on the T-section 16. The casing 39 is provided with a flange 40 which is suitably bolted or otherwise connected to the flange 38 for supporting the conduit 18.

The perforated sleeve 32 and the discharge conduit 18 form a continuous passage for the movement of fluid and solids and semi-solids within or through the apparatus 14. The movement of the solids out of the fluid is effected by means of a screw conveyor member 41 having a continuous helical flight 42 which extends from the end 43 just below or within the uppermost end of the perforated sleeve 32 to the discharge opening 44 in the conduit 18. The upper end of conduit 18 is provided with a support flange 45 which carries a suitable bearing assembly 46 for the conveyor 41. The drive pulley 23 is mounted on a shaft at the upper end of the bearing assembly to receive a drive belt 24 from the pulley 25. If desired an idler pulley 47 may be utilized. The pulley 25 is driven by a motor 26 through a gear reduction unit 48 and a shaft 49. The bearing 50 for the pulley 25 is supported on a suitable bracket 51 which is part of the mounting for the bearing 46 at the upper end of the conveyor 41. Other drive arrangements, of course, may be utilized, but in the present case it is found convenient to drive the conveyor 41 from its upper end so as to avoid the necessity for stuffing boxes in the inlet 16 to prevent leakage of fluid. As shown, the drive motor 26 is carried on a suitable mounting member 52 attached to the side of the casing 39.

In order to obtain substantially complete separation of the solids or insoluble from the washing fluid, as well as maintain a sufficiently high flow rate so that the washing solution can be completely cycled through the separator as rapidly as possible, it has been found that the fluid with its entrained foreign material must be handled quite gently, even at high flow rates so as to avoid as much disintegration of the solids as possible, pulping of the labels, or obstruction to flow by breakdown or packing of the insolubles. This good effect is achieved in a novel manner by providing within the casing 39 and adjacent the perforated sleeve 32 a baffle member 53 which, in the view of FIG. 2, is a cone shaped member symmetrically related to the perforated sleeve 32. Tubular forms are generally used, although any form or shape is contemplated. The lower smaller diameter end of the baffle 53 is held in spaced relation in the casing 39 by suitable spacer blocks 55 and the larger end 56 is held by similar spacer blocks 57. The end 56 of the baffle 53 is carried above the lower end 37 of the conduit 18 so that the screen is submerged, whereby the washing fluid passing into the inner annular space 58 between the sleeve 32 and the baffle 53 flows through the perforations under substantially equal pressure throughout the length of the sleeve 32. Thus, the flow through the sleeve 32 near the lower end 33 thereof is not under any substantially greater pressure than the flow through the perforations near the upper end. The washing fluid and entrained solids entering the inlet 16 through the pipe 15 are substantially unobstructively received in the lower end 33 of the sleeve 32, the only obstruction being the closed end 41a of the conveyor 41.

The initial flow upwardly in the sleeve 32 prevents or keeps the labels, for example, from clinging to the inner wall of the sleeve 32, and thereby no blinding of the perforations will occur. Only in the upper end portion of the sleeve 32 does the solid or insoluble material reach the screw flights 42 of the conveyor 41 so that upon rotation of the conveyor through its drive motor 26 the leading flight 43 will initiate lifting of the solids and foreign material upwardly into the conduit 18 where the washing fluid clinging to the materials will have a chance to drain downwardly by gravity before the material reaches the discharge opening 44 at the higher end of the conduit 18. The washing fluid moving into the annular space 58 flows over the top of the baffle 53 and into a second annular space 59 between the baffle 53 and the casing 39. The space 59 is provided with an outlet conduit 20 having a suitable flange 20a for connection to the recirculating pump 21 shown in FIG. 1.

For example, separator apparatus made in accordance with FIG. 2 successfully operated when the casing 39 was approximately 3 feet high, when the perforated sleeve had an effective length of approximately 2 feet, when the overlap of the upper end 56 of the baffle 53 above the lower end 37 of the conduit 18 was approximately 3 inches, and when the level of the washing fluid in the tank 10 was approximately 54 inches above the bottom of the perforated screen 32. The screen perforations were ⅛-inch so as to provide openings constituting 40 percent of the wall area for the perforated sleeve 32. The outlet pipe 20 was located at approximately 2 feet below the upper end 56 of the baffle 53. During operation the fluid level in the conduit 18 remained at approximately the position of flanges 38 and 40 indicating that the static head pressure in the perforated sleeve 32 was of a relative low order, thereby contributing greatly to the gentleness with which the solid materials, especially labels, were handled.

The apparatus removed a high percentage of pulping material and greatly reduced the creation of label pulp by the gentleness with which the fluid was entrained through the screen 32. While the foregoing dimensional characteristics have been set forth for one form of the apparatus which has operated successfully, it is not intended that the same be utilized as unnecessarily limiting or restricting the separator apparatus, as other dimensions may be found which will operate equally successfully. However, it is important to the principle of operation herein disclosed to provide baffle means adjacent the perforated sleeve 32 so as to separate direct flow between the perforations in the sleeve 32 and the outlet 20 by keeping the sleeve submerged.

In the view of FIGS. 3 and 4 it can be seen that the separator apparatus 14 is substantially similar in structural characteristics to the apparatus shown in FIG. 2, and wherever possible similar reference numerals will be applied to similar parts so as to avoid unnecessary repetition of description. Accordingly, the modified separator is provided with a side baffle member 60 made up of sheet or plate material formed to the configuration substantially shown in FIG. 4. The side baffle 60 is disposed so as to separate the interior of the casing 39 into a fluid receiving space 58a surrounding or containing the sleeve 32 and an outlet space 59a which directs the fluid to the outlet 20. It is believed that the side baffle 60 of the separator shown in FIGS. 3 and 4 is more suitable for smaller diameter casings 39 so that there will be adequate volume in the space 58a to receive the fluid from the perforated sleeve 32 as rapidly as is possible and with gentleness of handling the labels, solids and other materials. The baffle also establishes a condition in which the pumping action exerted at the outlet pipe 20 will not directly act on the perforated sleeve.

Turning now to FIG. 5 there is shown (in fragmentary sectional view) a separator 14a having the feed pipe 15 which is connected to the washer tank 10 (not shown here but which has been shown and described heretofore). The conveyor utilized in the separator 14a has been modified from that disclosed heretofore and consists in a tubular shaft 61 carrying on its exterior the flights 62 which operate within the perforated sleeve 32 and the conduit 18. As the shaft 61 is of tubular form its lower end 63 is open to receive fluid and entrained solids just as does the annular space between the tube 61 and the screen 32. The tubular shaft 61 extends upwardly in the conduit 18 and at a suitable distance above the mounting flange 38 for the conduit 18 the tubular shaft 61 is provided with an opening or window 64 so that the fluids and entrained solids entering at the inlet 63 will spill out at the opening 64 and fall onto the flights 62 of the conveyor. The location of the outlet 64 in the tubular shaft 61 for the conveyor is preferably located slightly below the level of the fluid in the washing tank 10 so that flow is created by reason of the static head differential between the tank and the tubular shaft 61. This flow path is independent of the flow path established in the annular space between the tubular shaft 61 and the screen 32, thereby combining with the heretofore described function of the separator a second material separating function operating on a gravity flow principle wherein a small static head pressure differential will create a gentle flow to raise principally pulpy material to a point where it can be gently spilled over onto the larger solid and semi-solid materials being carried upwardly by the flights 62. It has been found that the spilling of fluid with pulpy material entrained therein onto the solids rising in the flight 62 causes the pulpy material to cling to such solids thereby releasing the fluid which runs down in the conduit 18 and eventually passes through the outlet 20. In order to increase the rate of release of the fluid in the area adjacent the outlet 64, it can be seen that the flights adjacent outlet 64 are provided with perforations 62a which create a roughened surface and thereby increase the likelihood of holding pulpy materials against being washed down with the fluid. Instead of perforation 62a the adjacent flights may be otherwise treated to form roughened surfaces, and it is understood that the same may be used to replace the perforation 62a since the perforations actually cause the flight surface to seem rough when compared with plain unperforated surfaces located therebelow.

Turning now to FIG. 6 it can be seen that the modified separator 14b has many characteristics similar to the apparatus heretofore described, and similar reference numerals will be used wherever possible to indicate similar parts. However, in the present modified assembly the tubular shaft 61 is provided with flights 62 which are unperforated and extend from end to end thereof. Instead of perforating or roughening the surface of the flight adjacent the outlet 64 from the tubular shaft 61, as in the previous device, an extra flight 65 has been attached to the tubular shaft 61 to form a second helical device between the flights 62, but only in the upper end portion of the tubular shaft 61 adjacent the outlet 64.

In FIG. 7 the separator apparatus 14c has many parts similar to that shown in FIG. 5. Here, however, the apparatus includes an internal screw type conveyor 66 having flights 67 thereon which cooperate with the wall of the tubular shaft 61 having external flights 62 thereon. While the present separator may have the motor drive connection for rotating the tubular shaft 61, as heretofore shown, it is preferred that a two speed drive be provided for the tubular shaft 61 and screw conveyor 66. In this arrangement the two drives may operate at varying speeds so that the action of the flights 62 will be different from the action of the flights 67. The speed differential may be obtained by having two drive belts 24 and 24a driving the pulleys 23 and 68 respectively from the drive pulleys 25 and 25a connected to the common shaft 49 for motor 26.

In view of the foregoing details of description with respect to certain preferred constructions which the improved separator apparatus may have, it should be appreciated in what manner the apparatus operates. Accordingly, it is the intention to cover all of the variations and modifications herein disclosed, or which may come to mind after understanding the foregoing disclosure, by the appended claims.

What is claimed is:

1. Means for separating insolubles and pulpy materials from a source of fluid retained at a predetermined hydrostatic head, said separating means comprising: an upright casing having an inlet at its low end connected to the fluid source and a closure for its high end, an elongated perforated hollow sleeve fixed with one end at said casing inlet to receive the entire flow of fluid burdened with insolubles and pulpy materials, said sleeves being spaced along its length from said casing above said low end inlet and having its opposite end extending toward but short of engaging said high end closure and below the hydrostatic head of the source, a conduit connected to said opposite sleeve end and extending through said high end closure and above the hydrostatic head of the source to form a passage for insolubles and pulpy materials, the fluid passing through said sleeve perforations into said casing, baffle means in said casing arranged to extend from said casing low end upwardly short of said high end closure, but higher than said opposite end of said perforated sleeve, said baffle means dividing the casing interior into two spaces communicating above said baffle means, said perforated sleeve being in one space whereby fluid passing through said sleeve perforations collects in said one of said two spaces and flows into the other of said two spaces over the top of said baffle means, a fluid outlet connection for said casing open to said other space and leading to the fluid source, and means operable to move insolubles and pulpy materials brought to said sleeve by the fluid flow outwardly through said conduit, said conduit having a discharge spaced above said casing high end.

2. A system for separating insolubles from fluid including: a tank for the fluid in which insolubles collect; means forming a fluid flow conducting passage exterior of said tank and having a lower inlet end connected to said tank adjacent the bottom and a higher end above the level of the fluid in the tank formed with a discharge opening, said flow conducting means having a section adjacent its lower inlet end which is perforated; casing means enclosing said perforated section and having an outlet above said lower inlet end; conduit means connected between said casing outlet and said tank; baffle means mounted in said casing adjacent said perforated section in position to divide said casing into at least two spaces, one of said spaces being remote from said perforated section and another of said spaces being occupied by said perforated section and acting to collect fluid passed through the perforations of said perforated section and maintain a body of fluid submerging said perforated section, said baffle means having an upper end which is free of engaging said casing to provide direct communication between said spaces so that fluid freed of insolubles can flow over said upper end of said baffle means and into said remote space for return to said tank in said conduit means; and power means operable in said passage forming means to engage insolubles moved with the fluid into said perforated section and move the same toward said higher discharge opening beyond the reach of the fluid.

3. In a system for separating washing fluid from insolubles and pulpy materials and for returning the fluid for reuse while discharging said materials: a washing fluid tank; an outlet conduit to pass washing fluid and entrained materials out of said tank; a return conduit connected to said tank to bring fluid back; and a separator connected between said outlet and return conduits comprising a perforated screen to receive internally thereof fluid and entrained material and retain the materials while releasing the fluid through the perforations, a discharge conduit for said materials connected to and extending above said screen to a discharge opening above the level of fluid in said tank, means in said discharge conduit to remove the entrained material therefrom, a casing spacedly enclosing said screen and an adjacent portion of said discharge conduit, said tank outlet conduit being connected to said casing below said screen to direct the fluid flow thereto and said tank return conduit being connected to said casing above said outlet conduit connection, and means in said casing forming the space within such casing into a fluid receiving section containing said screen and a fluid outlet section communicating with said return conduit connection, said last means having a fluid overflow margin disposed above said screen and below the washing fluid level in said tank to maintain said screen submerged in fluid and substantially equalize the pressure drop across said screeen for its full effective length.

4. In a system of separating insolubles from a fluid by circulating the fluid burdened with insolubles from and back to a tank where insolubles initially enter the fluid; said system including a tank containing fluid at a predetermined level and in which insolubles collect, a separator device consisting of a vertically directed conduit having a low inlet end and a high discharge end above said predetermined fluid level in the tank, said conduit also having the lower portion of its length adjacent said low inlet end formed with perforations, a casing enclosing said perforated portion of said conduit and an additional adjacent unperforated section above said perforated portion, wall means in said casing spaced from said perforated portion and extending from adjacent said low inlet end upwardly to a position at least partly overlapping said additional unperforated section, the upwardly extending wall means having a free margin within said casing below the predetermined fluid level in said tank whereby the space adjacent said perforated portion of the conduit is constntly flooded with fluid and overflows to a space between said wall means and said casing around said free margin, a first pipe connected between the bottom portion of said tank and said low inlet end of said conduit, a second pipe connected between the bottom portion of said tank and said casing above the level of said low inlet end of said conduit, pump means connected into said second pipe to receive fluid substantially free of insolubles from said separator device and return it to said tank.

5. Separator apparatus for separating insolubles entrained with a fluid, said separator comprising an elongated conduit having an inlet end for fluid and insolubles and an outlet end for insolubles, a portion of the length of said conduit adjacent said inlet end being perforated to form a screen, a casing surrounding said screen portion of said conduit and extending from said inlet end beyond the length of said screen portion to provide a head spaced in said casing surrounding an unperforated portion of said conduit, unperforated baffle means mounted in said casing and dividing the casing interior into two spaces which are in communication only in said head space, one of said spaces containing said screen portion of said conduit, an outlet fitting mounted in a wall of said casing to open to the other of said two spaces, said outlet fitting being disposed between said inlet end and said head space, conveying means operably mounted in said conduit to extend from said inlet end to said outlet end for moving insolubles to the outlet end, and conveyor drive means disposed adjacent said outlet end.

References Cited

UNITED STATES PATENTS 3,080,065   3/1963   Hunt _____ 210—414

SAMIH N. ZAHARNA, *Primary Examiner.*